Patented May 5, 1942

2,282,175

UNITED STATES PATENT OFFICE 2,282,175

WELDING FLUX

Roy W. Emerson, Wilkinsburg, Pa., assignor to Westinghouse Electric & Manufacturing Company, East Pittsburgh, Pa., a corporation of Pennsylvania No Drawing. Application November 4, 1939, Serial No. 302,925

12 Claims. (Cl. 148—24)

My invention relates generally to welding, and it has reference, in particular, to a welding flux for fusion welding.

Heretofore, when fusion welding in the usual manner, the welding heat has been supplied from a single source. In electric arc-welding, for example, the arc is the sole source of welding heat, and the rate of welding is, therefore, dependent entirely upon the rate at which electrical energy may be converted into heat by the arc. As it is usually desirable when welding, and particularly when arc-welding, to use a welding flux, either in the form of a coating on a metallic electrode or in the form of a powder, paste, or the like, which may be applied to the work or supplied to the welding zone in any suitable manner, not all the heat developed by the arc is available for welding. Some of the heat developed in the arc is used to melt the flux so that, in general, the use of flux in relatively large amounts for the purpose of producing better welds, tends to lower the welding speed or limit the penetration secured.

Generally stated, it is an object of my invention to provide for increasing the welding speed in fusion welding processes without reducing the penetration of the weld.

More specifically, it is an object of my invention to provide a welding flux which shall function to produce additional heat in the zone of welding.

A further object of my invention is to provide a welding flux for use in fusion welding which shall function both as an additional source of heating energy and as a source of additional weld metal in the welding zone.

Another object of my invention is to provide a slag-forming welding flux which increases the available welding heat when arc welding, and permits higher welding speeds with bare metallic electrodes.

Still another object of my invention is to increase the available welding heat when arc-welding so as to secure better or deeper penetration of the weld at higher welding speeds.

A further object of my invention is to provide a welding flux for protecting the electric arc from the surrounding atmosphere while arc-welding and furnishing a covering for the deposited weld metal which may be easily removed and which gives the weld metal a smooth even surface.

A still further object of my invention is to provide an exothermic welding flux for use in electric arc-welding processes with bare metallic electrode wire which shall function to increase the welding speed and improve the quality of the weld.

Other objects will, in part, be obvious, and will, in part, be explained hereinafter.

In practicing my invention, instead of using a welding flux which detracts from the principal source of welding heat, I propose to provide a welding flux which, when supplied to the welding zone, may be ignited by the principal source of welding heat such as, for example, the electric arc in an electric arc-welding process, and then reacts exothermically to produce additional heat, and a protective slag coating for the weld metal, while at the same time furnishing additional weld metal. By supplying a flux of this kind to the work in the zone of welding in any suitable manner, and in sufficient quantity, the arc may be substantially enclosed by the flux. Under these conditions extremely high welding currents may be readily used with bare wire electrodes to produce sound welds of high strength.

The welding flux of my invention not only protects the arc from the surrounding atmosphere so as to prevent the formation of undesirable oxides and nitrides in the weld, but it also provides a relatively heavy slag coating over the weld metal which protects the weld metal while it cools. Because of the additional heat developed by the exothermic reaction of the flux when ignited, and the additional weld metal produced by the reaction, the rate of welding may be greatly increased over that used in welding in the usual manner without sacrificing any of the desirable weld characteristics. Welds having perfect penetration, smooth and even surfaces, and free from gas pockets or slag inclusions may thus be secured while welding at speeds much faster than heretofore.

A welding flux embodying the principles of my invention may, for example, comprise principally the following classes of materials;

(1) An oxide or oxides of a metal or metals to be deposited in the weld;

(2) A metal, metals, or an alloy containing a metal or metals capable of reacting exothermically with the oxide or oxides to reduce them to the metallic form when ignited;

(3) A suitable fluxing agent or agents for improving the physical characteristics of the slag formed by the reaction of the materials (1) and (2), so as to lower its melting point and reduce its viscosity, and make it more readily removable from the work after the weld is completed; and (4) Suitable arc stabilizing materials.

Of the materials which may be classified generally in class (1) of the preceding paragraph iron oxide ($Fe_3O_4$ or $Fe_2O_3$) is an example. This material is commercially available in large quantities at a reasonable cost, and may be readily reduce to produce iron (Fe). Other metallic oxides may also be used in practicing my invention for producing weld metal, either separately, with iron oxide, or in different combinations with each other, depending on the composition of the weld metal desired. Thus, manganese oxide, silicon oxide, vanadium oxide, molybdenum oxide, titanium oxide, and oxides of other metals it is desired to include in the weld, may be used in varying proportions.

Of the materials of class (2), aluminum (Al) may be considered as a good example. It acts as a reducing agent for a large number of the metallic oxides, is commercially available at a reasonable cost, and is easy and inexpensive to handle. When used to reduce iron oxide it is particularly satisfactory and produces a relatively large amount of heat. Other metals such as, for example, calcium, silicon, magnesium, and manganese, may, however, also be used for reducing the oxide or oxides of the flux to produce weld metal and additional heat. These metals may be used separately or in varying combinations as desired, and I do not intend to limit my invention to the use of these metals alone, since commercial forms of these metals containing two or more of them in varying proportions, or one or more of them with other metals, may also be used successfully. For example, ferromanganese, ferrosilicon, silicomanganese, and the like, may be used for reducing the oxide or oxides of the flux.

When a welding flux comprising, for example, a mixture of finely divided particles of iron oxide and at least an equivalent weight of finely divided particles of aluminum, that is, at least enough aluminum to theoretically completely reduce the iron oxide, is supplied to the welding zone and is contacted by the electric arc or other principal source of welding heat, a reaction takes place which may be illustrated by the following equation:

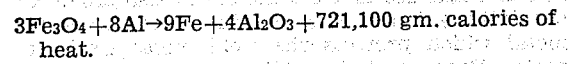

$3Fe_3O_4 + 8Al \rightarrow 9Fe + 4Al_2O_3 + 721{,}100$ gm. calories of heat.

Since the reaction is exothermic it may be realized that it may under some circumstances be almost spontaneous. In order to control the rate of the reaction it has been found desirable to effectively separate the active ingredients by adding a material which may be relatively inert, and acts only to dilute the concentration of the active ingredients.

As the slag produced by the reaction of the active ingredients, which in this instance is principally aluminum oxide, has a relatively high melting point, in order to produce welds free from slag inclusions it has been found desirable to use a fluxing agent or fluxing agents to improve the physical characteristics of the slag. Thus the materials of class (3) may serve a dual purpose, not only improving the slag characteristics, but also serving to slow down the rate of the reaction.

Numerous materials may be used as fluxing agents in class (3). Examples of those that may be used are, the alkaline earth metal compounds, including the oxides of calcium, barium, and strontium, and the carbonates of these same metals. Silica ($SiO_2$), when used in conjunction with the above compounds, also is highly successful as a fluxing agent and helps to slow down the rate of the reaction to within the desired limits, making it commensurate with the welding speeds used. Wollastonite ($CaSiO_3$), a calcium silicate, has been found in this respect remarkably effective in lowering the melting point of the slag produced by the reaction, so that the danger of slag inclusions in the weld is removed, and also making the slag more easily removable from the work after the weld is completed.

In addition to the above materials, many of the metallic oxides such as, for example, manganese oxide, titanium oxide, magnesium oxide, and the like, may be used as fluxing agents in conjunction with the alkaline earth metal compounds, either separately, or in combination with each other.

I have also found that greatly improved results may be obtained by adding a limited amount of an alkaline earth metal or an alkali metal halide to a welding flux embodying my invention. Materials of this type, such as, for example, fluorspar ($CaF_2$), sodium fluoride (NaF), and cryolite ($AlF_3.3NaF$) apparently act as solvents for the molten aluminate slag during welding, and greatly decrease its viscosity. The molten slag being more fluid, is more easily displaced by the molten weld metal. The slag thus rises to the top of the weld more easily and the possibility of slag inclusions occurring in the weld is greatly decreased.

Materials of class (4) may also be added, if desired, for increasing the stability of the arc, particularly where welding is being done on relatively light materials at relatively low currents. Titanium oxide is a good example of a material of this class. Other arc stabilizing materials such as, for example, sodium silicate, the oxides of barium, potassium, lithium, sodium and cesium, and others well known in the art, may also be used if desired, without altering the invention in any manner. By using a carbonate, such as, for example, calcium carbonate ($CaCO_3$) as a fluxing agent, carbon dioxide is liberated during the flux reaction. The production of carbon dioxide in the welding zone appears to be very beneficial in stabilizing the arc.

In some instances it may be desirable to add slight amounts of a deoxidizing agent to the flux to insure complete deoxidation of the weld metal. An excess of aluminum over the amount required to reduce the iron oxide of the welding flux may, for example, be used under some circumstances. Other deoxidizing agents which have given very satisfactory results are ferromanganese and ferrosilicon. When welding mild steels, for example, enough ferromanganese may be added to the flux to not only deoxidize the weld metal but also provide a source of manganese for the weld metal so that from .4% to .6% manganese is included therein.

A welding flux embodying my invention, which has been used with satisfactory results in the welding of mild steel such, for example, as that used in structural steel work and which may be considered as a representative example, has the following analyses, by weight.

| | Percent | Preferred percent |
|---|---|---|
| Iron oxide | 20–45 | 30 |
| Aluminum | 7–15 | 10 |
| Wollastonite | 20–50 | 34 |
| Silica | Up to 35 | 13 |
| Fluorspar | Up to 15 | 7 |
| 85% ferromanganese | Up to 10 | 6 |

The materials may be mixed together in the powdered form, preferably being at least fine enough to pass through a 20 mesh sieve, so that the reaction may be complete as possible and rapid enough. The flux may be supplied to the zone of welding in any suitable manner, being, for example, either deposited along the line of the weld prior to the commencement of the welding operation, or, if desired, fed from some form of hopper or the like, in connection with the welding mechanism which provides for feeding the welding electrode. The arc may be struck and maintained in any well known manner, and provisions may also be made for moving the electrode along the line of the weld in any suitable manner.

The flux may be supplied to the zone of welding in any desired quantity, and any flux not used in welding may be collected in any suitable manner and used in other welding operations. By supplying the flux to the work slightly in advance of the arc in sufficient quantities that it forms a heap, which encloses the arc, the surrounding atmosphere may be excluded from the arc, and the formation of undesirable oxides and nitrides in the weld may be prevented. If desired, guide bars of copper or the like may be positioned on either side of the weld to retain the flux in a heaped condition about the weld or other suitable means may be used.

When the arc strikes the flux, the flux ignites and the aluminum reacts with the iron oxide to produce iron which is deposited as weld metal. The ferromanganese insures deoxidation of the weld metal and is partly deposited as weld metal improving the characteristics of the weld. The heat produced by the reaction of the aluminum and iron oxide is sufficient not only to continue the reaction at the proper rate so that the flux ignites slightly in advance of the arc, but also to melt the other materials of the flux, so that a calcium-silicon aluminate slag is formed. This slag has a relatively low melting point, and the fluorspar lowers the viscosity of the molten slag sufficiently to insure all of the slag floating to the top of the weld metal. Thus a protective coating is provided for the deposited weld metal without the danger of slag inclusions in the weld metal. The slag coating protects the weld metal while it cools, so that the ductility of the weld metal is improved. With the preferred flux comprising iron oxide, aluminum, wollastonite, silica, fluorspar and ferromanganese in the proportions stated on page 2, the resultant slag may be found by calculation to comprise a calcium silicon aluminate slag having a theoretical ratio of calcium oxide to aluminum oxide to silicon oxide of approximately 24:29:47, on the basis of weights.

The heat produced by the reaction assists the principal source of welding heat, in this instance the arc, so that the arc may be moved along the line of welding more rapidly than in the usual welding operation. Since weld metal is also produced by the flux the metallic electrode may for this reason also be moved along the line of welding more rapidly, so that the rate of welding may be thereby greatly increased. Since the proper amount of welding heat is produced, the welds secured have perfect penetration, even at these higher speeds.

For example, using a flux of the composition hereinbefore described in detail, plates or work pieces of mild steel up to one inch in thickness may be welded in a single pass with complete penetration. Plates or work pieces of considerable thickness may be successfully welded without specially preparing the edges thereof and plates having a thickness of three-eighths inch have been successfully welded in this manner. Plates one-half inch in thickness may be welded at a rate of from 23 to 26 inches a minute using a one-quarter inch bare wire electrode, with an arc voltage of from 34 to 37 volts, and a welding current of 1100 to 1175 amperes.

It is to be understood that the foregoing examples are merely illustrative of the results obtained and are not to be interpreted in a limiting sense.

From the above description it will be apparent that my invention has provided a welding flux having novel and important characteristics which greatly expedites fusion welding, and in particular, arc-welding. Not only does a flux embodying my invention provide a protective sheath about the arc so as to exclude the surrounding atmosphere during welding, but it also provides a protective coating for the deposited weld metal which improves the physical characteristics of the weld metal and also improves the appearance of the weld. Because of the additional heat furnished by the reaction of the active materials of the flux, a greater proportion of the heat developed in the arc or the principal source of welding heat, may be utilized in fusing the metal of the work being welded, and the additional weld metal, if any, such as, for example, where a filler rod or a metallic electrode is used. Since the flux develops sufficient heat to make the reaction substantially self-sustaining, it thereby assists the principal source of welding heat. The rate of welding may, therefore, be increased without reducing the weld penetration or otherwise proving detrimental. Since additional weld metal is also produced by the reaction of the flux, the arc may be moved more rapidly along the line of the weld than where all the weld metal must be supplied by a filler rod or metallic electrode.

Since certain changes may be made in the above description, and different embodiments of the invention may be made without departing from the spirit thereof, it is intended that all the matter contained in the above description shall be considered as illustrative, and not in a limiting sense.

I claim as my invention:

1. A powdered exothermic fluxing material for use in metallic arc welding comprising, finely divided particles of iron oxide, aluminum in an amount sufficient to completely reduce the iron oxide, an alkaline earth metal compound for lowering the melting point of the resultant aluminate slag, and an additional deoxidizing agent for the weld metal.

2. A powdered exothermic electric arc welding flux for application to work on which a welding operation is to be formed comprising, finely divided particles of iron oxide, aluminum in sufficient amount for reducing the iron oxide, to provide weld metal and a halide salt in sufficient quantity for lowering the viscosity of the slag oxide formed sufficiently to free the weld metal of slag inclusions.

3. A welding flux for electric arc-welding comprising a mixture of finely divided particles of iron oxide, silicon, and an alkaline-earth-metal compound.

4. An arc-welding flux comprising, a mixture of finely divided particles of iron oxide, manganese and an alkaline-earth-metal compound.

5. A powdered exothermic arc-welding flux for application to the zone of welding to be ignited by the arc comprising, a mixture of finely divided particles of iron oxide, any one of the metals of the group consisting of aluminum, silicon, manganese, calcium and magnesium in sufficient quantity to reduce the iron oxide and form weld metal, and an alkaline-earth metallic silicate.

6. An electric arc-welding flux for application to work to be welded so as to be ignited by the arc and produce additional heat to assist the arc comprising, finely divided particles of iron oxide, aluminum slightly in excess of the amount required to reduce the iron oxide and produce at least a portion of the weld metal, an alkaline-earth-metal silicate, and an alkali metal or an alkaline-earth-metal halide to reduce the viscosity of the resultant slag sufficiently to prevent slag inclusions in the weld.

7. A heat producing welding flux for application to work to be welded in the zone of welding comprising, a mixture of finely divided materials and including as the basic ingredients, iron oxide, aluminum in sufficient quantity to reduce the iron oxide, calcium silicate, silica and an alkali metal or an alkaline-earth-metal halide.

8. An exothermic electric arc-welding flux comprising as the principal ingredients, finely divided particles of iron oxide, aluminum in the amount required to reduce the iron oxide, and an alkaline-earth-metal silicate in sufficient quantity to produce a slag having a theoretical ratio calculated on the basis of weights of an alkaline-earth-metal oxide to aluminum oxide to silicon oxide of approximately 24:29:47.

9. A heat generating welding flux comprising, iron oxide 20% to 45%, aluminum in sufficient quantity to reduce the iron oxide and produce heat, wollastonite 20% to 50%, silica up to 35%, fluorspar up to 15% and ferromanganese up to 10%.

10. A welding flux comprising, as the principal ingredients, iron oxide 6% to 20%, 85% ferromanganese 6% to 25%, wollastonite 20% to 50%, silica up to 20%, calcium fluoride up to 15% and 50% ferrosilicon up to 5%.

11. A flux composition comprising iron oxide 20% to 35%, 50% ferrosilicon 8% to 20%, wollastonite 20% to 55%, calcium fluoride up to 15% and 85% ferromanganese up to 10%.

12. A welding flux comprising iron oxide 30%, aluminum 10%, wollastonite 34%, silica 13%, calcium fluoride 7% and ferromanganese 6%.

ROY W. EMERSON.